June 2, 1959  D. E. PATTERSON  2,888,898
DUAL PLUNGER BLINKER SIGHT FEED FOR INTERMITTENT LOW FLOW RATES
Filed May 22, 1958
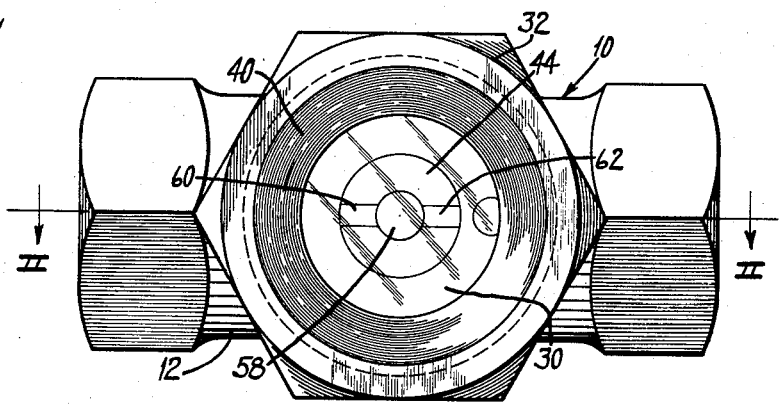
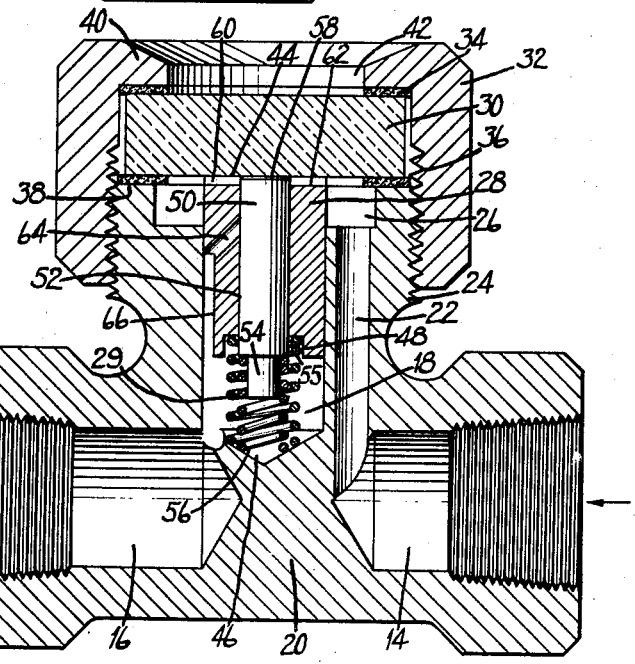
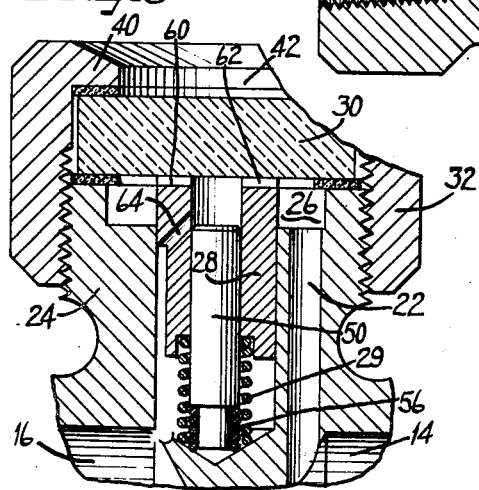
Inventor
Donald E. Patterson
Attys

United States Patent Office 2,888,898
Patented June 2, 1959

2,888,898

DUAL PLUNGER BLINKER SIGHT FEED FOR INTERMITTENT LOW FLOW RATES

Donald E. Patterson, Buffalo, N.Y., assignor to Houdaille Industries, Inc., Buffalo, N.Y., a corporation of Michigan Application May 22, 1958, Serial No. 737,121

10 Claims. (Cl. 116—117)

This invention relates to an improved sight feed indicator which is adapted for use with fluid pressure systems having intermittent low flow rates and more particularly to a sight feed indicator in which lower flow rates than are detectable by the usual sight feed indicators may be ascertained as a result of a dual plunger and color contrast structure for the device.

Heretofore, a number of sight feed indicators have been available which have operated on the principle of a depressible plunger biased upwardly into proximate relationship with a sight window in a sight casing or body, and responsive to a predetermined pressure to permit passage of fluid from one side of the casing to the other while affording a visual indication of the extent of fluid flow according to the depth of the fluid between the window and the plunger.

Such sight indicators have been subject to the difficulty that a considerable fluid pressure and extent of flow is required before an adequate visual representation is achieved and have been further subject to considerable difficulty in manufacture.

The present invention overcomes these difficulties by means of a dual plunger construction in which a pair of plungers are spring mounted in a sight feed body having a sight window extending across the upper ends of the plungers, the plungers being disposed in coaxial, concentric relationship. The sight body provides an axial passage in communication with a source of fluid supply and opening at its upper end into an annular chamber surrounding the outer plunger. The outer plunger is preferably stationary and extends upwardly above the level of the lower wall of the annular chamber into abutting relationship with the window, so that its annular upper end stands out vividly with respect to the annular flow chamber around it, and cooperates with the inner plunger to provide a "color dot." The ends of the outer and inner plungers may be given a suitable metallic coloring if desired, and it will be evident that depression of the inner plunger will create a sharp visual "blinking" impression by removal of the central area of the color dot, regardless of the color or lack of color of the fluid. Thus the outer plunger defines a pair of diametrically aligned channels on each side of the inner plunger, and when fluid is introduced at intermittent low rates into the annular chamber, it will be effective to depress the inner plunger and indicate lower flow rates than have been detected heretofore. The outer plunger defines a passage extending from the inner bore thereof to the bore in which the outer plunger is received and to the outlet side of the casing. When the inner plunger has been depressed to a predetermined extent, therefore, fluid will pass from the annular chamber to the bore for the outer plunger and thence into the feed line, for transmission to a terminal point.

Accordingly, it is an object of the present invention to provide a dual plunger blinker sight feed which is adapted to indicate intermittent low fluid flow rates by means of an outer plunger having an annular upper surface adapted to engage against a sight window for the indicator and an inner plunger normally disposed in abutting engagement with the window within the outer plunger and depressible in response to low intermittent rates of fluid flow to afford an immediately discernible color contrast.

Another object of the invention is to provide a dual plunger blinker sight feed as described wherein the outer plunger extends upwardly into an annular chamber beneath the sight window which communicates with a fluid feed inlet line, the contrast between the fluid in this annular chamber and the upper end of the outer plunger serving further to accentuate the position of the inner plunger so that a "color dot" is defined whose central area blinks in response to movement of the inner plunger.

Another object of the invention is to provide a sight indicator as described in which the upper end of the outer plunger has formed therein opposed diametrically aligned channel elements which are normally prevented from communication with one another by the inner plunger but which afford fluid flow into engagement with the inner plunger such as to depress the inner plunger in response to a relatively low intermittent fluid flow.

Another object of the invention is to provide a feed indicator as described in which the outer plunger defines a passage which leads to an outlet portion of the line in which the indicator is positioned, the passage communicating with the inlet line when the inner plunger is depressed slightly, the manufacture of the device being more efficient and economical than has been possible with sight flow indicators heretofore available.

Another object of the invention is to provide a sight indicator as described in which the presence of relatively low flow from one side to the other of the indicator is detectable by means of direct visual contrast between the upper end of the inner plunger and the upper end of the outer plunger even when a relatively colorless fluid is utilized in the system.

Another object of the invention is to provide a dual plunger blinker sight feed as described wherein an extremely compact structure is afforded having a minimum of parts for long lasting wear and simplicity of operation.

Other objects and advantages of the invention will become apparent as the discription proceeds in accordance with the drawings in which Figure 1 is a top plan view of the dual plunger blinker sight feed according to the present invention;

Figure 2 is a vertical sectional view taken through the lines II—II of Figure 1; and Figure 3 is a view corresponding to Figure 2 and showing the device of the invention in flow-transmitting position.

Referring now to Figures 1–3, the dual plunger blinker sight feed 10 of the invention comprises a sight feed body 12 having coaxial boxes 14 and 16 at the inlet and outlet sides thereof and a vertical bore 18 extending upwardly at right angles to the bores 14 and 16. It will be seen that the bores 14 and 16 terminate at their inner ends in predetermined spaced relation as defined by a wall 20 therebetween, the bore 14 being spaced outwardly from the axis of the bore 18 to a slightly greater extent than the bore 16. A passage 22 extends axially upwardly through a boss 24 of the body 12, in radially spaced relation to the bore 18, and opens into an annular recess 26 which is formed coaxially around the bore 18. The bore 18 extends into the wall 20 to an extent such that it is in communication with the bore 16 to provide a continuous passage through the sight feed body 12 as hereinafter further described.

In order to afford a highly visible contrast indicator for low intermittent fluid flow rates, an outer plunger 28 is snugly received in the bore 18 and urged upwardly by a spring 29 into substantially stationary abutting engagement with a sight window 30 held in position by a retaining gland or nut 32 threadedly secured upon the boss 24. Upper and lower gaskets 34 and 36 are disposed around the marginal edges of the window 30, the lower gasket 36 seating upon a shoulder 38 at the outer end of the boss 24 and the upper gasket 34 engaging an overlying annular flange 40 on the gland 32. Thus the gland 32 defines an opening 42 which affords visual access to the upper end 44 of the plunger 28 and the annular recess 26. The lower end of the spring 29 bears against the bottom wall 46 of the bore 18 and is received at its upper end in an annular recess 48 in the plunger 28. An inner plunger 50 is slidably received within a bore 52 in the plunger 28, this plunger having a depending extension 54 and a shoulder 55 between the extension 54 and the upper portion of the plunger against which a spring 56 bears. The spring 56 is disposed centrally within the spring 29 and likewise bears at its lower end upon the bottom wall 46 of the bore 18, and is of a predetermined strength such as to urge the upper end 58 of the plunger 50 into contact with the window 30 while permitting relatively easy downward movement of the plunger in response to intermittent fluid pressure as hereinafter further described. The extension 54 thus assists in positioning the spring 56, while the upper portion of the plunger 50 maintains the coaxial alignment of the spring 29 relative to the spring 56.

The upper end 58 of the plunger 50, therefore, cooperates with the upper end 44 of the plunger 28 in presenting a "color dot" appearance at the sight window 30, the outer edges of this dot being set off by the annular recess 26. In order to afford downward movement of the plunger 50 in response to low rates of intermittent fluid flow, however, the upper end of the plunger 28 (which serves as a bushing for plunger 50) defines a pair of diametrically aligned channels 60 and 62 which are normally closed from each other at their inner ends by the plunger 50. When fluid at even a relatively low flow is introduced into the recess 26 through the bore 14 and the passage 22, it is directed through the channels 60 and 62 so as to depress the plunger 50, the marginal edge of the end 58 of the plunger 50 being bevelled slightly at preferably a 45° angle for this purpose. Transmission of the fluid to the outlet bore 16 is afforded by a preferably downwardly inclined passage 64 in the plunger 28, as well as by a channel 66 extending downwardly from the outer end of the passage 64 and opening into the power portion of the bore 18. The passage 64 is spaced a predetermined distance from the window 30 such that when the plunger 50 has moved downwardly to a slight extent such as to afford a blinker contrast between the outer annular surface 44 and the central area 58, fluid will be permitted to flow through the passage 64 and channel 66 into the lower end of the bore 18 and thence into the bore 16. It will be readily appreciated that a generally constant supply of fluid is maintained in the sight body 12 to afford fully effective operation of the device.

The upper end 44 of the plunger 28 and the upper end 58 of plunger 50 may, if desired, be provided with a metallic color coating, of either similar or contrasting shades, although the natural appearance of the metal or other material in the plungers will afford a fully effective contrast or "binding" action when the plunger 50 is depressed by even relatively low, intermittent flow rates, regardless of whether the fluid is of a dark color or is colorless. This "blinker" effect therefore provides decided advantages over sight feed indicators heretofore available, while the simplicity and compactness of the sight body structure of the invention affords substantial cost savings and long life operation. The coaxial bores 14 and 16 may be readily formed in communication with the bore 18 without the need of multiple conduits therebetween, the passage 22 between the conduit 14 and the recess 26 and the separately formed bores in the plunger 28 being readily machined without the need for special manufacturing procedures.

Although I have herein set forth and described my invention with respect to certain specific principles and details thereof, it will be obvious to those skilled in the art that these may be varied without departing from the spirit and scope of the invention as set forth in the hereunto appended claims.

I claim as my invention:

1. A fluid flow sight indicator comprising a sight feed body having an inlet passage and an outlet passage, a sight window in said body, a bushing in said sight feed body having an end portion disposed in proximate relationship to said window, a plunger slidably received within said bushing, spring means urging an end of said plunger into abutting engagement with said window, flow passage means defined in said sight feed body adapted to transmit fluid from said inlet passage to said end of said plunger, and flow passage means defined in said bushing and said sight feed body adapted to transmit fluid from said inlet passage to said outlet passage when said plunger is depressed to a predetermined extent by fluid introduced into said inlet passage, said plunger cooperating with said bushing and said sight window to afford a blinker indication of fluid flow through said sight indicator.

2. A fluid flow sight indicator comprising a sight feed body, said sight feed body defining an inlet passage and an outlet passage, a sight window in said sight feed body, said sight body defining a recess beneath said sight window, a bushing defining a bore and extending through said recess into proximate relationship with said window and providing a sharp visual contrast with said recess, a plunger slidably received in said bore, spring means urging an end of said plunger into contact with said window, said sight feed body defining a passage leading from said inlet passage to said recess and fluid flow conduit means in said bushing and said sight feed body leading from said bore at a predetermined distance below said window to said outlet passage and adapted to transmit fluid from said inlet passage to said outlet passage when said plunger is depressed to a predetermined extent by fluid introduced into said inlet passage, whereby said plunger coacts with said bushing and said sight window to afford a blinker indication of fluid flow through the said sight indicator.

3. A fluid flow sight indicator comprising a sight feed body, said sight feed body defining an inlet passage and an outlet passage, a sight window in said sight feed body, said sight body defining a recess beneath said sight window, a bushing defining a bore and extending through said recess into substantially abutting relationship with said window, said bushing providing a sharp visual contrast with said recess and having a channel in the portion thereof disposed in abutting relationship with said window extending between said recess and said bore, a plunger slidably received in said bore, spring means urging an end of said plunger into contact with said window, a passage in said sight feed body extending from said inlet passage to said recess and fluid flow means in said bushing and said sight feed body leading from said bore at a predetermined distance below said window to said outlet passage and adapted to transmit fluid from said inlet passage to said outlet passage when said plunger is depressed to a predetermined extent by fluid introduced into said inlet passage, said plunger coacting with said bushing and said sight window to afford a blinker indication of fluid flow through said sight indicator.

4. A dual plunger fluid flow sight indicator comprising a sight feed body defining an inlet passage, an outlet passage, a bore communicating with said outlet passage at the inner end of said bore, a recess at the outer end of said bore and a passage extending from said inlet passage to said recess, a sight window in said body in overlying sealed relationship to said bore and said recess, a plunger snugly received in said bore and having an axial bore therein, a passage leading from said axial bore to said bore receiving said plunger, a channel extending from said passage in said plunger to the inner end of said plunger and a channel in the outer end of said plunger leading from said recess to said bore in said plunger, spring means urging said plunger into contact with said window at its outer end, a second plunger slidably received in said first plunger, and spring means urging said second plunger into contact with said window, said first plunger providing bushing means for said second plunger and said passage in said first plunger opening into said bore in predetermined spaced relationship to said outer end of said first plunger such as to permit fluid flow from said inlet passage to said outlet passage when a predetermined fluid pressure is exerted upon said second plunger, said second plunger coacting with said first plunger and said sight window to provide a blinker indication of fluid flow through said sight indicator.

5. A dual plunger fluid flow sight indicator comprising a sight feed body defining a inlet passage, an outlet passage, said sight feed body having a bore communicating with said outlet passage at the inner end thereof, a recess at the outer end of said bore, and a passage extending from said inlet passage to said recess, a sight window in said sight feed body in overlying sealed relationship to said bore and said recess, a plunger snugly received in said bore and defining an axial bore therein, means leading from said bore in said plunger to said outlet passage, said plunger defining a channel in the outer end thereof leading from said recess to said bore in said plunger, spring means urging said plunger into contact with said window at its outer end, a second plunger slidably received in said first plunger, and spring means urging said second plunger into contact with said window, said first plunger providing bushing means for said second plunger and said second plunger coacting with said first plunger and said sight window to afford a blinker indication of fluid flow through said sight indicator.

6. A dual plunger fluid flow sight indicator comprising a sight feed body defining an inlet passage, an outlet passage, a bore communicating with said outlet passage at the inner end of said bore, a recess at the outer end of said bore and a passage extending from said inlet passage to said recess, a sight window in said body in overlying sealed relationship to said bore and said recess, a plunger snugly received in said bore defining an axial bore therein, conduit means leading from said bore in said plunger to said outlet passage, spring means urging said plunger into contact with said window at its outer end, a second plunger slidably received in said first plunger, and spring means urging said second plunger into contact with said window, said first plunger providing bushing means for said second plunger and said second plunger coacting with said first plunger and said sight window to afford a blinker indication of fluid flow through said sight indicator.

7. A dual plunger fluid flow sight indicator comprising a sight feed body defining an inlet passage, an outlet passage, a bore communicating with said outlet passage at the inner end of said bore, a recess at the outer end of said bore and a passage extending from said inlet passage to said recess, a sight window in said body in overlying sealed relationship to said bore and said recess, a plunger snugly received in said bore defining an axial bore therein, said plunger defining a passage leading from said axial bore to said bore receiving said plunger, a channel extending from said passage in said plunger to the inner end of said plunger and a channel in the outer end of said plunger leading from said recess to said bore in said plunger, spring means urging said plunger into contact with said window at its outer end, a second plunger slidably received in said first plunger and having a peripheral bevel affording a pressure surface for moving the second plunger and the first plunger, and spring means urging said second plunger into contact with said window, said first plunger providing bushing means for said second plunger and said passage in said first plunger opening into said bore in predetermined spaced relationship to said outer end of said first plunger such as to permit fluid flow from said inlet passage to said outlet passage when a predetermined fluid pressure is exerted upon said second plunger whereby said second plunger cooperates with said first plunger and said sight window to afford a blinker indication of fluid flow through said sight indicator.

8. A dual plunger fluid flow sight indicator comprising a sight feed body defining an inlet passage, an outlet passage, a bore communicating with said outlet passage at the inner end of said bore, a recess at the outer end of said bore and a passage extending from said inlet passage to said recess, a sight window in said body in overlying sealed relationship to said bore and said recess, a gland defining an opening threadedly secured to said body with said opening in register with said window and holding said body in said window in said overlying sealed relationship to said body, a plunger snugly received in said bore defining an axial bore therein, a passage leading from said axial bore to said bore receiving said plunger, a channel extending from said passage in said plunger to the inner end of said plunger and a channel in the outer end of said plunger leading from said recess to said bore in said plunger, spring means urging said plunger into contact with said window at its outer end, a second plunger slidably received in said first plunger, and spring means urging said second plunger into contact with said window, said first plunger providing bushing means for said second plunger and said passage in said first plunger opening into said bore in predetermined spaced relationship to said outer end of said first plunger such as to permit fluid flow from said inlet passage to said outlet passage when a predetermined fluid pressure is exerted upon said second plunger whereby said second plunger coacts with said first plunger and said sight window to afford a blinker indication of fluid flow through said sight indicator.

9. A method of manufacturing a sight flow indicator comprising the steps of forming a pair of substantially coaxial bores in a sight body with the inner ends of said bores terminating in predetermined spaced relationship, forming a bore extending substantially perpendicularly to said coaxial bores and terminating in communication with one of said bores, forming a bore in radially spaced relation to said perpendicular bore in communication with the other of said coaxial bores, forming a recess at the upper end of said perpendicular bore in communication with said radially spaced bore, forming a plunger adapted to be slidably received in said perpendicular bore, forming an axial bore in said plunger, forming a passage extending from said axial bore to said exterior of said plunger, forming a channel in the exterior of said plunger extending from said passage to an inner end of said plunger, forming a channel across the outer end of said plunger and forming a second plunger adapted to be slidably received in said axial bore.

10. A method of manufacturing a sight flow indicator comprising the steps of forming a pair of substantially coaxial bores in a sight body with the inner ends of said bores terminating in predetermined spaced relationship, forming a bore extending substantially perpendicularly to said coaxial bores and terminating in communication with one of said bores, forming a bore in radially spaced relation to said perpendicular bore in communication with the other of said coaxial bores, and forming a recess at the upper end of said perpendicular bore in communication with said radially spaced bore.

References Cited in the file of this patent

UNITED STATES PATENTS 1,385,973     Brown _____ July 26, 1921